(No Model.)
J. SOPER & J. SLADE.
CAR AXLE BOX.
No. 254,171. Patented Feb. 28, 1882.
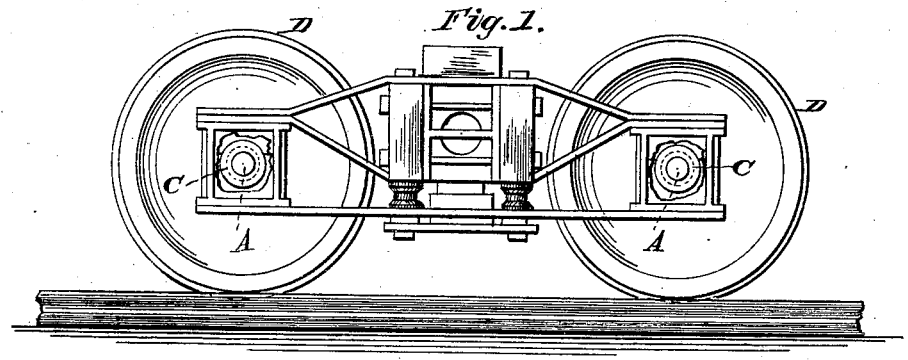
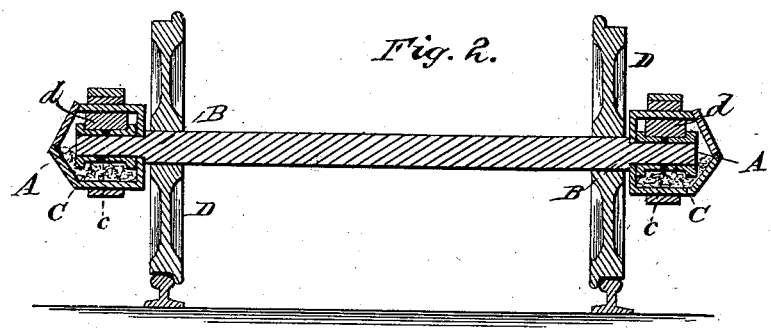
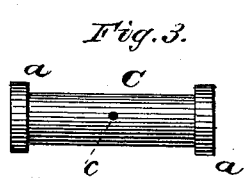
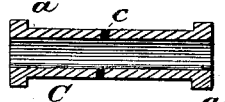
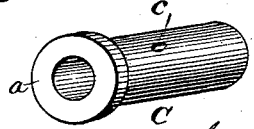
WITNESSES
Fred. G. Dietrich
P. C. Dietrich
INVENTORS
James Soper
Jonathan Slade
by De Witt C. Allen, Attorney
N. PETERS, Photo-Lithographer, Washington, D. C.

UNITED STATES PATENT OFFICE.

JAMES SOPER AND JONATHAN SLADE, OF CHICAGO, ILLINOIS.

CAR-AXLE BOX.

SPECIFICATION forming part of Letters Patent No. 254,171, dated February 28, 1882.

Application filed August 31, 1881. (No model.)

*To all whom it may concern:*

Be it known that we, JAMES SOPER and JONATHAN SLADE, citizens of the United States, residing at Chicago, in the county of Cook and State of Illinois, have jointly invented certain new and useful Improvements in devices for reducing or diminishing friction in journals or axles for bearings or wheels; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to certain new and useful improvements in a device adapted to be applied to the journals or axles of bearings or wheels of vehicles for reducing, diminishing, or dividing friction; and the invention consists in novel features of construction and combination and arrangement of parts, all as will be hereinafter fully described, and specifically pointed out in the claim.

Referring to the accompanying drawings, Figure 1 represents a side elevation of the truck of a car or other vehicle, with the caps for the bearings broken away to show our improvements; Fig. 2, a longitudinal vertical section through one of the axles of the same; Figs. 3, 4, 5, and 6, detail views.

In the drawings, A represents the journals or axle of a car or other wheel, and B the hub or cap over the projecting end of said journal or axle for containing the lubricant material.

C represents a second or floating journal loosely mounted on the end of the axle or journal A, for relieving, diminishing, or dividing the ordinary friction between the axle and wheel or journal and bearing. This journal or axle should be provided with holes or slots $c$, to admit of the passage of oil or other suitable lubricant material from the top to the bottom, or vice versa, of the journal or axle of wheel or bearing D. This second journal or axle C is made in two sections, if desired, and provided with end annular ribs, $a\ a$, as shown in Figs. 3 and 4, or a central annular rib, as shown in Figs. 5 and 6, or merely a tube with an end annular rib for holding it in place, as shown in Fig. 8, said rib or ribs engaging with the bearing $d$, which prevents any longitudinal movement of the journal. This device is intended for the journal of any wheel or bearing, and can be duplicated one or more times, as shown in Fig. 9. This second journal or axle C, being loose, (or what might be termed a "floating" journal or axle,) greatly relieves, diminishes, or divides the friction on the main axle A, as it serves as a revolving bearing turning partially with the main axle or journal.

Having thus fully described our invention, what we claim as new, and desire to secure by Letters Patent, is—

The combination, with the main axle or journal of a wheel for a car or other vehicle, of a loose or floating journal and bearing C, having lubricant opening $c$, and annular rib or ribs $a$, the cap D, and bearing $d$, substantially as and for the purpose herein shown and described.

In testimony whereof we affix our signatures in presence of two witnesses.

JAMES SOPER.
JONATHAN SLADE.

Witnesses:
S. C. KNIGHT,
M. R. FRESHWATERS.